UNITED STATES PATENT OFFICE.

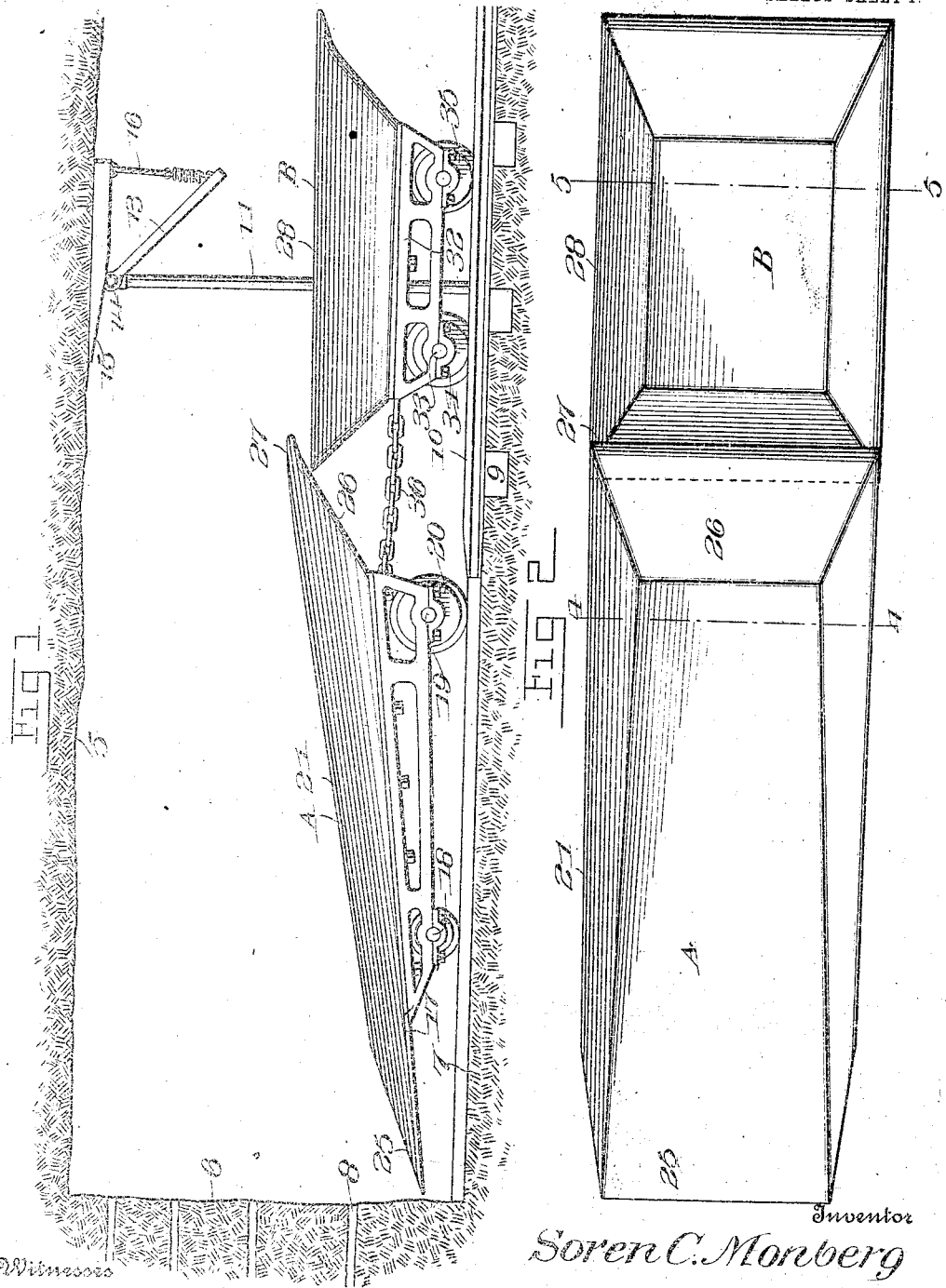

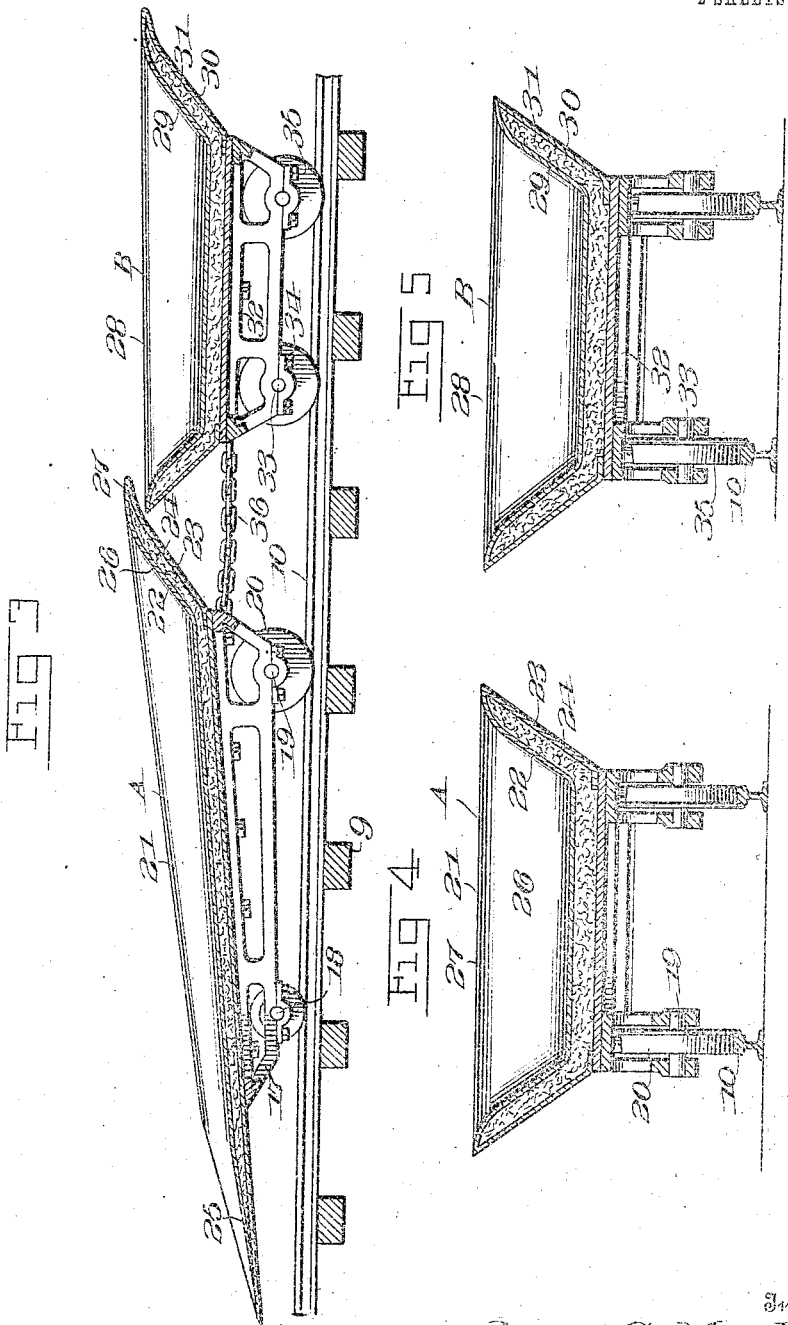

SOREN C. MONBERG, OF LEADVILLE, COLORADO.

CHARGE-RECEIVING TRUCK.

1,062,492.  Specification of Letters Patent.  Patented May 20, 1913.

Application filed August 27, 1912. Serial No. 717,374.

*To all whom it may concern:*

Be it known that I, SOREN C. MONBERG, a citizen of the United States, residing at Leadville, in the county of Lake and State of Colorado, have invented new and useful Improvements in Charge-Receiving Trucks, of which the following is a specification.

The invention relates to mine cars, and more particularly to the class of charge receiving trucks for use in tunnels, drifts, or the like.

The primary object of the invention is the provision of a truck wherein charges will be caught from blasting within a tunnel, drift, or other underground excavation, so as to avoid the possibility of the charge falling upon the runway or track for the truck and thereby blocking the exit for the same within the tunnel, drift, or the like.

Another object of the invention is the provision of a truck of this character wherein the charge when delivered thereto will be buffed on its entrance into the truck through the medium of a packing confined between the inner and outer walls of said truck thereby avoiding damaging of the same, resultant from the velocity of the charges when blasting the same, the truck being especially designed to prevent the charges from falling upon the road-bed over which the said truck travels when entering or leaving the tunnel, drift or the like.

A further object of the invention is the provision of a truck of this character which will positively receive the charges on blasting interiorly of a tunnel, drift, or the like, whereby the charges may be conveyed exteriorly thereof in a ready and convenient manner.

A still further object of the invention is the provision of a truck of this character which is simple in construction, strong, durable, and inexpensive in manufacture.

With these and other objects in view the invention consists in the construction, combination and arrangement of parts as will be hereinafter more fully described, illustrated in the accompanying drawings, and pointed out in the claims hereunto appended.

In the drawings: Figure 1 is a vertical longitudinal sectional view through a tunnel, drift or the like, showing the blast holes in the end wall thereof and the truck constructed in accordance with the invention in position for receiving the charge on the blasting within the tunnel. Fig. 2 is a top plan view of the main and trailer trucks. Fig. 3 is a vertical longitudinal sectional view therethrough. Fig. 4 is a sectional view on the line 4—4 of Fig. 2. Fig. 5 is a sectional view on the line 5—5 of Fig. 2.

Similar reference characters indicate corresponding parts throughout the several views in the drawings.

Referring to the drawings by numerals 5 designates generally a tunnel, 6 the closed inner end thereof, and 7 the bed, the inner end 6 being formed with blast holes 8, constructed in the ordinary well-known manner. The bed 7 of the tunnel has embedded therein at intervals the usual cross ties 9 on which are supported the track rails 10, which are fastened thereto in any suitable manner, and are laid so as to extend longitudinally within the tunnel 5 in proximity to the inner closed end wall 6 thereof for the guiding of trucks presently described thereinto.

Located a considerable distance spaced from the inner end wall 6 of the tunnel 5 interiorly thereof is a doorway 11 in which is swingingly mounted a door or gate 13 the same being suspended upon a hinged pintle 14 from the head of the doorway, which latter is removably held in position within the tunnel through the medium of wedge members 15 which are driven between the edge at the head of the doorway 11 and the top wall of the tunnel, the wedges being connected to the door or gate 13 through the medium of a cable 16 so as to avoid the possibility of the loss of the wedges when disengaged from between the doorway and the top wall of the tunnel or when not in use. Movable over the rails 10 of the track are charge receiving trucks A and B, the former comprising a forwardly inclined bed 17 supported upon front and rear axles 18 and 19 respectively, having journaled thereon track wheels 20, the wheels upon the front axle 18 being of considerable less diameter than the wheels supported upon the rear axle 19, so that the said truck A will forwardly tip, and supported upon the head 17 thereof is a body 21 including spaced inner and outer sheet metal walls 22 and 23 and an intermediate packing 24, therebetween, the packing being composed of suitable cushioning material such as rags, paper, rubber, cork, or other like material, so as to absorb undue shocks and jars of impact from the charges falling thereonto on the blasting of the inner wall 6 of the tunnel. The body 21 of the truck at its lowermost end is formed with a socket-like extension 25, while the opposite elevated end is forwardly sloped at 26 and is provided with a rearwardly extended lip 27, the side walls of the body 21 being upwardly diverged with respect to each other, so as to protrude laterally beyond the rails of the track 10 to prevent the charges from falling on the track.

The trailer truck B comprises a substantially hopper-shaped body 28 formed with inner and outer spaced walls 29 and 30 respectively and an intermediate cushioning packing 31 therebetween, the said packing being formed from any suitable resilient material and this body 28 is supported upon a horizontal bed 32, having fixed thereto axles 33 supporting front and rear track wheels 34 and 35 respectively, the same being of uniform diameters with respect to each other and are adapted to travel upon the rails 10 of the track.

The trailer truck B is flexibly connected with the rear end of the truck A through the medium of a chain coupling 36, whereby the front end of the truck B will extend in proximity to the body 21 of the truck A, so that the lip 27 will overlap the said forward end of the truck B, and thereby obviate the possibility of the charges falling between the said trucks A and B when coupled together.

During the blasting of the tunnel 5, the charges blasted will be thrown backwardly into the said tunnel and caught upon the trucks A and B, whereby the said charges may be transported exteriorly of the tunnel in any ordinary well-known manner.

From the foregoing description, taken in connection with the accompanying drawings, it is thought that the construction and operation of the invention will be clearly understood, and therefore, a more extended explanation has been omitted.

What is claimed is:—

1. In a mine truck, a body having a resilient packing between its inner and outer surfaces throughout the area thereof, the said body being forwardly inclined, and a shovel-like extension at its lowermost end.

2. In a mine truck, a body having a resilient packing between its inner and outer surfaces throughout the area thereof, the said body being forwardly inclined, a shovel-like extension at its lowermost end, and a lip projecting outwardly from the opposite end of the body.

3. In a mine truck, a body having a resilient packing between its inner and outer surfaces throughout the area thereof, the said body being forwardly inclined, a shovel-like extension at its lowermost end, a lip projecting outwardly from the opposite end of the body, and a trailing truck having loose connection with said first named truck whereby one end of the said trailing truck will be overlapped by the lip on the first named truck.

4. In a mine truck, a body having a resilient packing between its inner and outer surfaces throughout the area thereof, the said body being forwardly inclined, a shovel-like extension at its lowermost end, a lip projecting outwardly from the opposite end of the body, a trailing truck having loose connection with said first named truck whereby one end of the said trailing truck will be overlapped by the lip on the first named truck, and wheels supporting said trucks respectively, and adapted to travel upon a track.

In testimony whereof I affix my signature in presence of two witnesses.

SOREN C. MONBERG.

Witnesses:
M. DWYER,
S. C. LYON.